No. 814,243. PATENTED MAR. 6, 1906.
T. C. SMITH & W. A. MARTIN.
PHOTOGRAPHIC FLASH LIGHT APPARATUS.
APPLICATION FILED SEPT. 15, 1905.
3 SHEETS—SHEET 2.
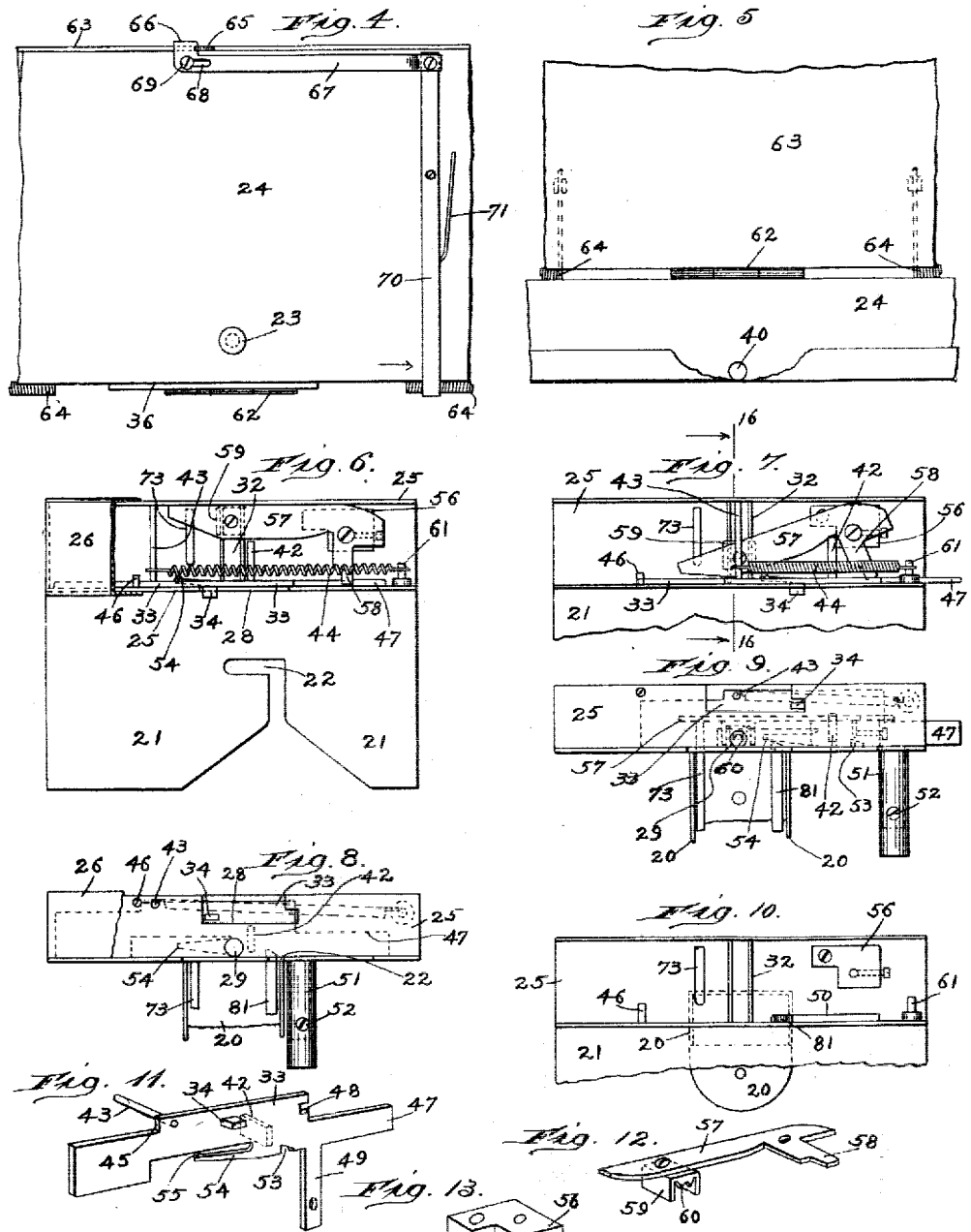
Witnesses:
Chas. E. Gorton
M. A. Nyman
Inventors:
Thomas C. Smith
and Washington A. Martin
By Chas. C. Tillman Atty

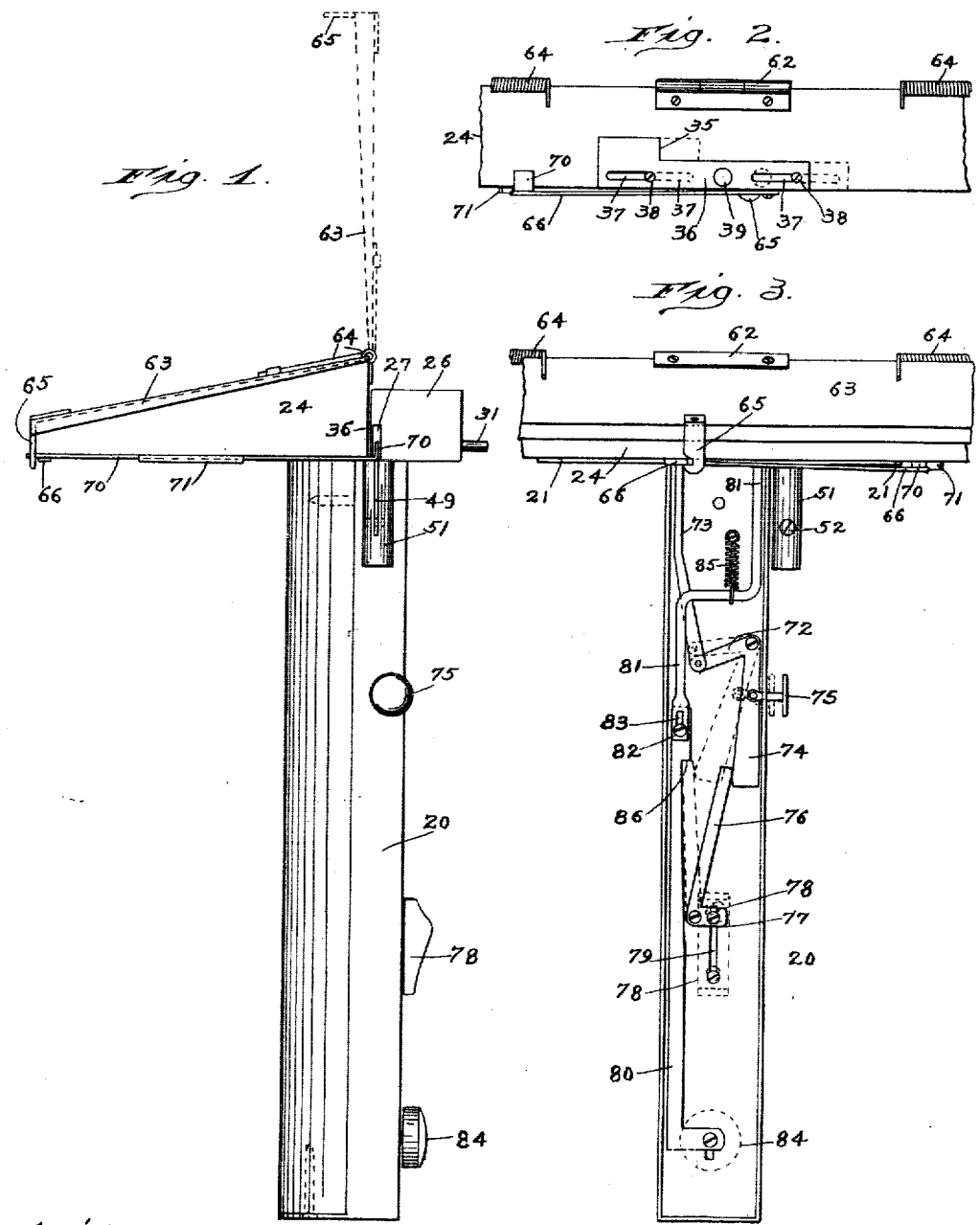

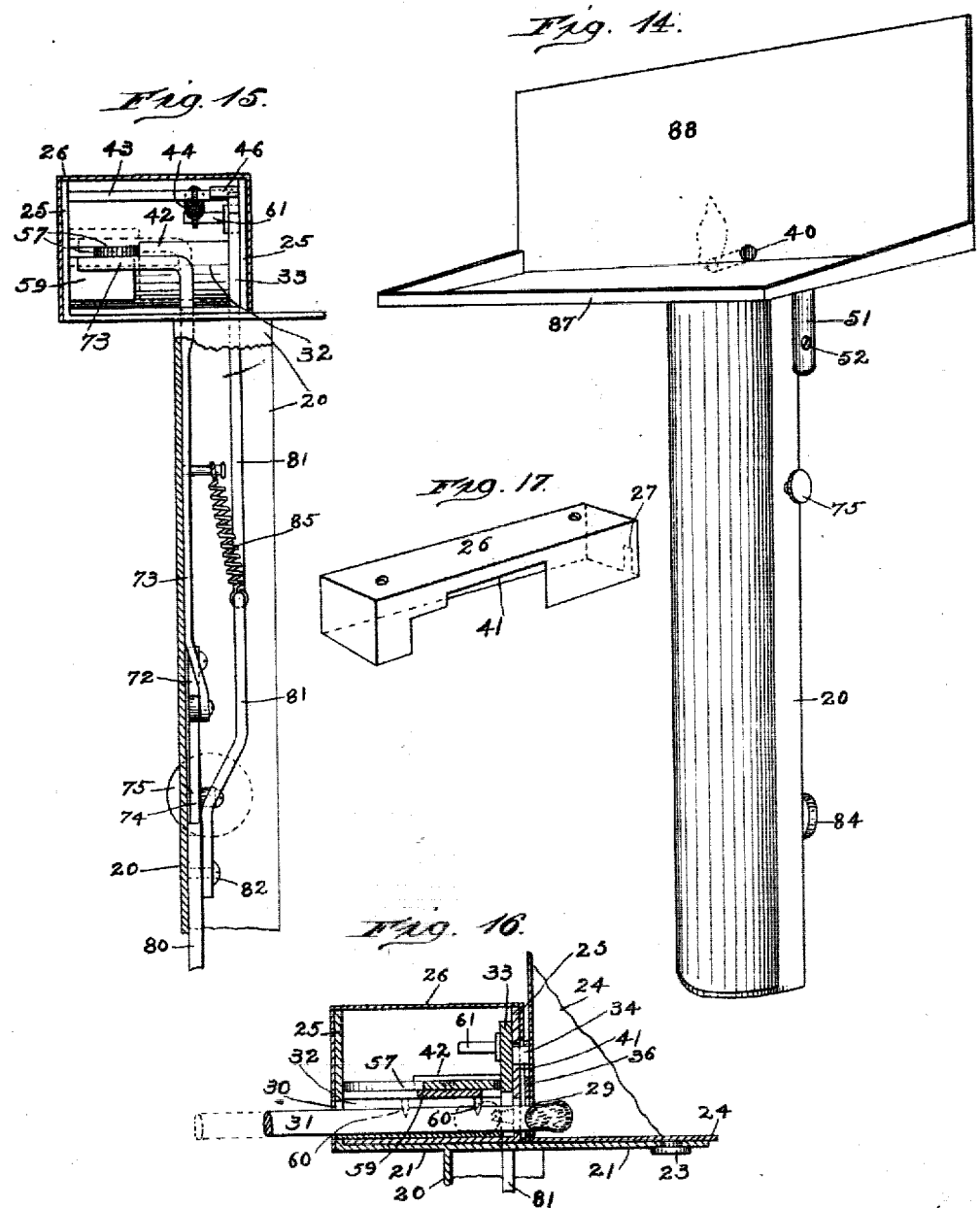

UNITED STATES PATENT OFFICE.

THOMAS C. SMITH AND WASHINGTON A. MARTIN, OF CHICAGO, ILLINOIS.

PHOTOGRAPHIC FLASH-LIGHT APPARATUS.

No. 814,243.     Specification of Letters Patent.     Patented March 6, 1906.

Application filed September 15, 1905. Serial No. 278,569.

*To all whom it may concern:*

Be it known that we, THOMAS C. SMITH and WASHINGTON A. MARTIN, citizens of the United States, residing at Chicago, in the county of Cook and State of Illinois, have invented certain new and useful Improvements in Photographic Flash-Light Apparatus, of which the following is a specification.

This invention relates to certain improvements in that class of photographic flash-light apparatuses of which the device shown and claimed in our pending patent application, Serial No. 243,224, filed January 30, 1905, is a type; and the objects thereof are mainly the same as those set forth in said application—namely, to provide a simple, inexpensive, and manually-operated apparatus to be used by photographers for creating an instantaneous and brilliant light by the use of powder in order that good, clear, and sharply-defined photographs may be produced and which shall be so constructed that the inflammable powder employed for producing the light will be protected from the wind or displacement, as well as against accidental ignition.

Another object is to provide a flash-light apparatus in which ordinary percussion-matches may be used for igniting the powder.

A still further object is to provide means for striking or exploding the head of the match and at the same time advancing or projecting it into the powder-pan.

Other objects and advantages of the invention will be disclosed in the subjoined description and explanation.

The invention consists in certain novel features of the construction and combinations and arrangements of the several parts thereof, all as will be hereinafter fully set forth.

The novel features of the invention will be carefully defined in the claims.

In the accompanying drawings, which serve to illustrate our improvements, Figure 1 is a view in side elevation of a flash-light apparatus embodying one form of our invention, showing the parts by full lines in position ready for use and illustrating by dotted lines the raised position of the protecting-cover for the powder. Fig. 2 is a rear view of a portion of the powder-pan, showing the movable plate for closing and opening the touch-hole therein and the means for releasing the spring-actuated cover for said pan. Fig. 3 is a front view in elevation of a portion of the powder-pan with its cover in its closed position and showing said pan mounted on the handle, the front portion of which has been removed to disclose the operating mechanism. Fig. 4 is a fragmental bottom plan view of the powder-pan, showing the means for retaining and releasing its cover. Fig. 5 is a fragmental face view of the pan, showing its cover raised. Fig. 6 is a plan view of the supporting-plate for the firing mechanism and powder-pan, showing the parts of the firing mechanism in the positions they will occupy when ready to fire or ignite the match. Fig. 7 is a similar view of like parts, but showing them in the positions they will occupy after the match has been fired or ignited. Fig. 8 is a face view of the parts shown in Fig. 6, showing them mounted on a portion of the handle and illustrating parts of the firing-trigger and match-controlling lever. Fig. 9 is a similar view of like parts, showing the positions they will occupy after the match has been fired or ignited. Fig. 10 is a plan view of a portion of the supporting-plate and the casing for the firing mechanism, showing the latter removed. Fig. 11 is a detached perspective view of the firing-slide. Fig. 12 is a similar view of the match holder and projector. Fig. 13 is a detached perspective view of the block on which the match-holder is mounted. Fig. 14 is a front perspective view of the apparatus, showing a modification in the construction of the powder-pan. Fig. 15 is a view in side elevation of a portion of the handle, showing the supporting-plate and casing for the firing mechanism mounted thereon with one end of said casing and one side of the handle removed to disclose the firing mechanism and operating-levers. Fig. 16 is an enlarged cross-sectional view taken on line 16 16 of Fig. 7 looking in the direction indicated by the arrows, and Fig. 17 is a detached perspective view of the casing-cover.

Like numerals of reference refer to corresponding parts throughout the different views of the drawings.

The reference-numeral 20 designates the handle, which is hollow and may be made of any suitable size, form, and material. Secured on the upper end of the handle is a supporting-plate 21, which has in its front edge a bayonet-slot 22 to receive a headed projection 23 on the lower surface of the powder-pan 24, which slot and projection afford what may be termed "bayonet-catches" and convenient means for detachably connecting said parts. The plate 21 is provided on its upper surface at its rear edge with a box-like casing 25 for the retention of the firing mechanism, and said casing has a detachable cover 26 in the form of three sides of a rectangular figure which fits over the casing 25, as is clearly shown in Figs. 1, 6, 15, and 16 of the drawings, thereby closing the ends of the casing. One end of the cover 26 is provided near its front wall with a vertical slot 27 for the passage of a portion of the striking-slide for the match. The front wall of the casing is provided with a longitudinal slot or cut-out portion 28 and below the same with a circular opening 29, which registers with a similar opening 30 in the rear wall of the casing for the match 31, which is of the ordinary percussion variety. Extending horizontally across the bottom of the casing from the opening 29 to the opening 30 therein is a semitubular piece 32, which will act as a guideway for the match. Movably located on the inner surface of the front wall of the casing is a striking-slide 33, which is provided on its front surface at about its middle with a projection 34, which extends forwardly through the slot 28 to engage a shoulder 35 on a sliding plate 36, which is movably secured, by means of slots 37 and screws 38, on the rear surface of the rear wall of the powder-pan 24, and said plate is provided with an opening 39, adapted to register with an opening 40 in said wall of the pan. In order to permit of the longitudinal movement of the plate 36, the front wall of the casing-cover 26 is cut away, as at 41. (See Figs. 16 and 17.) The striking-plate 33 carries on its inner surface two inwardly-extending projections 42 and 43, the former to coact with the match projector or advancer to force it back to its position when the firing mechanism is cocked and the latter to act as a support for one end of the spring 44, as well as means to hold the striking-plate against the inner surface of the front wall of the casing, for it will be observed that the projection 43 extends to and rests against the inner surface of the rear wall of the casing. The upper edge of the slide 33 is provided at one of its ends with a cut-away portion to form a shoulder 45, so that said cut-away portion may operate under and the shoulder will strike an inwardly-extending projection 46 on the front wall of the casing to restrict the slide in its movement in one direction. The opposite end of the slide is reduced to form an extension 47, adapted to pass through the slot 27 in one end of the casing and to impinge the releasing-lever for the cover of the pan-holder. At the inner end of the extension 47 the slide 33 is provided with a recess 48 to engage an arm on the match-projector, as will be presently explained. Extending downwardly from the lower edge of the slide 33 is a projection 49, which passes through and operates in a longitudinal slot 50 in the bottom of the casing, and said projection may be covered by a tubular piece 51 and secured thereto by means of a screw 52, thus providing a cocking-pin for the firing mechanism. Inwardly from and near the projection 49 the lower edge of the slide 33 is provided with a recess 53 for the upper end of the firing-trigger. The lower portion of the slide 33 is provided near the recess 53 with a longitudinally-extending striking-arm 54, which, as is clearly shown in Figs. 6, 9, and 11, is slightly deflected inwardly and has on its free end teeth 55 to engage the head of the match. By reference to Fig. 11 it will be seen that the lower surface of the arm 54 is upwardly inclined toward its free end, so as to slide over the upper end of the firing-trigger, thereby depressing it and causing it to engage the notch or recess 53 in the lower edge of the slide. Mounted on the upper surface of the bottom of the casing 25 is a block 56, on which is secured one end of the match projector or advancer, which consists of a bar or piece 57, which may be made of spring-steel, so as to yield slightly at its free end, or it may be loosely secured to the block 56, thus permitting a slight upward movement of its free end. Near its pivoted end the bar or projector 57 is provided with a laterally-extending arm 58, adapted to engage the recess 48 in the firing-slide when the latter has been released from its retracted position. Near its free end the bar 57 is provided on its lower surface with a channeled piece 59, which carries on its upper portion in one of its ends downwardly-extending teeth 60 to engage the body of the match. As shown in Figs. 6, 7, 9, 12, and 16, the projector 57 lies horizontally in the casing 25, and the channeled piece 59 extends across said bar just above the guideway 32 for the match, and that the front edge of the bar 57 is cam-shaped or outwardly curved, so that when the firing-slide is forced to its cocked position the projection 42 thereon will impinge the front surface of the projector 57 and force it rearwardly to the position shown in Fig. 6 of the drawings. As before stated, one end of the spring 44 is secured to the inward projection 43 on the firing-slide and the other end thereof to a projection 61 on the front wall of the casing, and said spring is employed to actuate the firing or igniting slide.

Secured to the upper edge of the rear wall of the pan 24 by means of a hinge 62 is a cover 63 for the pan, which is actuated or automatically opened when the front part thereof is released by means of springs 64, attached to the rear wall of the pan and said cover. The front portion of the cover 63 is provided at its middle with a downwardly-extending hook 65 to engage an outward extension 66 on one end of a bar 67, which is slidably mounted, by means of a slot 68 and a screw 69, on the front portion of the bottom of the pan and is pivotally secured to one end of the cover-releasing lever 70, which extends across the bottom of the pan and upwardly a slight distance at the rear thereof, so as to be in position to be struck by the extension 47 of the firing-slide when the latter is released from its retracted position. The lever 70 is actuated by a spring 71, secured at one of its ends to the bottom of the pan, and has its other end resting against the lever 70 to the rear of its fulcrum, thereby causing the extension or catch 66 to engage the hook 65 when the cover is closed.

Fulcrumed in the upper portion of the handle 20 is a bell-crank lever, to the shorter arm 72 of which is pivotally secured the lower end of a rod 73, which passes through a suitable opening in the supporting-plate 21 and bottom of the casing 25 near one side of the guide 32 thereon and is then bent horizontally across the casing to rest under the match-projector near its free end and is for the purpose of raising said projector, so that the match may be inserted through the opening 30 in the rear wall of the casing. Secured to the longer arm 74 of said bell-crank lever is a push-pin 75, which projects through an opening in one side of the handle and is used for operating the rod 73 and through it the match-projector. The lower end of the longer arm 74 engages on its inner edge the upper end of a safety-lever 76, which is also fulcrumed on the back of the handle and has secured to an arm 77 on its lower portion a push or sliding pin or button 78, which operates in a vertical slot 79, formed in the back of the handle therefor. Longitudinally located in the handle is a firing-trigger, which comprises two pieces or bars 80 and 81, which are loosely connected together at their inner ends by means of a screw 82 and a slot 83, through which the screw passes. The lower end of the portion 80 is provided with a push pin or button 84, which extends through an opening in the rear portion of the handle. The upper portion 81 is bent transversely of the handle and then upwardly, as shown in Fig. 3, and has its upper end beveled and projecting through an opening in the bottom of the casing, so as to engage the notch or recess 53 on the striking-slide. The portion 81 is upwardly actuated by a spring 85, which is secured at one of its ends to said part and at its other end to the handle. The part 80 of the firing-trigger is provided on its inner edge with a shoulder 86 to receive the upper end of the safety-lever 76, as shown by dotted lines in Fig. 3 of the drawings.

In Fig. 14 we have shown a modification in the construction of the powder-pan, which consists in using a pan 87, having at its rear portion and forming the rear wall thereof an upright plate or reflector 88, which is rigidly secured to the pan instead of being hinged thereto, as in the former construction. In using this modified form of the powder-pan a sliding plate 36 of the construction shown in Fig. 2 and above described is employed to open and close the opening 40 in the rear wall of the pan.

The operation of the apparatus is as follows: When the powder-pan 24, with the protecting-cover, is employed, powder may be placed in said pan by moving the releasing-lever 70 in the proper direction, which operation will disengage the extension 66 from the hook 65 on the cover, thus permitting the same to be automatically raised by means of the springs 64 thereon. When a sufficient quantity of powder may be placed in the pan and properly distributed therein, so that a portion of the powder will be located in the touch-hole 40, the cover may be lowered and fastened in its lowered position by means of the hook 65, which engages the extension 66. When the pan is thus supplied with powder, it will be understood that the sliding plate 36 thereon will occupy the position shown by dotted lines in Fig. 2, so that the opening 40 in the rear wall of the pan will be closed. By placing the projection 23 on the lower surface of the pan in the slot 22 of the supporting-plate and by sliding the pan sidewise in said slot it is apparent that the projection 34 on the striking-slide 33 of the firing mechanism, which mechanism should be cocked, as shown in Figs. 6 and 8, before the pan is placed in position on the supporting-plate, will be in position to engage the shoulder 35 on the sliding plate 36, which opens and closes the opening 40 in the rear wall of the powder-pan. When the parts are in the above-named positions, by pressing the push-pin 75 inwardly the safety-lever 76 will be caused to engage the shoulder 86 on the lower portion 80 of the firing-trigger, thus holding the upper portion 81 of the firing-trigger in engagement with the recess 53 of the firing-slide. By the same operation the rod 73 will be forced upwardly, thereby raising the free end of the match holder and advancer 57, so that the match may be inserted through the opening 30 in the rear wall of the casing until its head approximates the sliding plate 36 on the rear wall of the powder-pan. By removing the pressure from the push-pin 75 the match holder and advancer 57 will be lowered, so that its teeth 60 will engage the body of the match, as shown by dotted lines in Fig. 16. When it is desired to fire the match, so as to produce the light, the slide or push-button 78 should be moved downwardly, which will release the safety-lever 76 from the firing-trigger, when by pushing downwardly on the push-pin 84 said trigger will be disengaged from the recess 53 of the firing-slide, thus permitting it to be projected by means of the spring 44, in which operation the extension 47 on said slide will strike the rear and upturned portion of the releasing-lever 70, thus causing the extension 66 to be disengaged from the hook 65, so as to permit the cover 63 to be automatically elevated. As the firing-slide 33 is thus projected the arm 58 on the match holder or projector 57 will engage the recess 48 in said slide, and thus cause the free end of the match-holder to be moved toward the front wall of the casing 25 and carry with it the match, which will be projected through the openings 29 in the casing and opening 40 in the powder-pan, as is clearly shown in Fig. 16 of the drawings, when the powder will be ignited and the flash or light produced. When a pan of the construction shown in Fig. 14 is used, the same operation as above set forth is employed, except, of course, that the releasing and closing of the cover is dispensed with. It is obvious that the safety-lever 76 may be used or omitted, if desired; but to prevent the accidental ignition of the powder or the releasing of the firing mechanism we prefer to use the same.

Having thus fully described our invention, what we claim as new, and desire to secure by Letters Patent, is—

1. In a photographic flash-light apparatus, the combination with the supporting-handle, of a firing mechanism mounted thereon, a powder-pan supported on the handle, a cocking-pin for said mechanism, a holder and projector for the match, means to project the same, and means to release said cocked mechanism.

2. In a photographic flash-light apparatus, the combination with the supporting-handle, of a casing mounted on one end thereof and provided in its front and rear walls with an opening for a percussion-match, a powder-pan connected to the casing and adapted to communicate therewith, a firing mechanism in said casing provided with a cocking-pin projecting therefrom, a match holder and projector located in the casing and coacting with the firing mechanism to hold and project the match, means to raise said holder, and means to release the cocked mechanism.

3. In a photographic flash-light apparatus, the combination with the supporting-handle, of a casing mounted on one end thereof and provided in its front and rear walls with an opening to receive a percussion-match, a powder-pan connected to the casing, a firing mechanism in said casing, a cocking-pin secured to a part of said firing mechanism and projecting through the casing, a holder and projector located in the casing and coacting with the firing mechanism to hold and project the match, means to project the match-holder, and a firing-trigger located on the handle and projecting into the casing to release the cocked mechanism.

4. In a photographic flash-light apparatus, the combination with the supporting-handle, of a casing mounted on one end thereof and provided in its front and rear walls with an opening, a powder-pan connected to the casing and adapted to communicate therewith, a firing mechanism in said casing, a cocking-pin secured to a part of said firing mechanism and projecting through the casing, a firing-trigger on the handle and projecting into the casing, a holder and projector located in the casing and coacting with the firing mechanism to hold and project the match, means to project said holder, and a safety-lever on the handle adapted to engage the firing-trigger.

5. In a photographic flash-light apparatus, the combination with the supporting-handle, of a casing mounted on one end thereof and provided in its front and rear walls with an opening, a powder-pan connected to the casing and adapted to communicate therewith, a spring-actuated cover for said pan, means to hold the cover in its lowered position, a firing mechanism in the casing, a cocking-pin secured to a part of said mechanism and projecting through the casing, a holder and projector located in the casing and coacting with the firing mechanism to hold and project the match, means to raise and project said holder, and means to release the cocked mechanism and the cover of the pan.

6. In a photographic flash-light apparatus, the combination with the supporting-handle, of a casing mounted on one end thereof and provided in its front and rear walls with an opening, a powder-pan connected to the casing and adapted to have communication therewith, a spring-actuated cover for said pan, means to hold the cover in its lowered position, a firing mechanism in the casing, a cocking-pin connected to a part of said mechanism and extending through the casing, a holder and projector located in the casing and coacting with the firing mechanism, means to hold and project the match, a firing-trigger on the handle projecting into the casing, a safety-lever on the handle and adapted to engage said trigger, a rod longitudinally mounted on the handle and extending into the casing to engage the holder or projector, and means to raise said rod and throw the safety-lever into engagement with the firing-trigger.

7. In a photographic flash-light apparatus, the combination with the supporting-handle, of a casing mounted on one end thereof and having in its front and rear walls an opening, of a spring-actuated firing-slide movably mounted on one of said walls and having a recess in its lower edge and an inwardly-deflected arm provided with teeth, a cocking-pin secured to said slide and projecting through the casing, a holder and projector located in the casing and coacting with the firing-slide, means to hold and project the match, a firing-trigger located on the handle and projecting into the casing so as to engage the firing-slide, a rod longitudinally mounted on the handle and extending into the casing to engage the holder or projector, and means on the handle to raise said rod.

8. In a photographic flash-light apparatus, the combination with the supporting-handle, of a casing mounted on one end thereof and provided in its front and rear walls with an opening, a powder-pan connected to the casing and adapted to have communication therewith, a spring-actuated firing-slide movably mounted on one of said walls and having a recess in its lower edge, the said slide having on its inner surface an inward projection and an inwardly-deflected arm, a bar secured horizontally and longitudinally in the casing and provided near its secured end with a laterally-extending arm to engage one end of the firing-slide, said bar having its front edge curved outwardly and adapted to engage said inward projection on the firing-slide, a channeled and toothed piece secured across the lower surface of the bar near its free end, a cocking-pin secured to the firing-slide and projecting through the casing, a firing-trigger located on the handle and projecting into the casing, a safety-lever on the handle and adapted to engage said trigger, a rod longitudinally mounted on the handle and extending into the casing to engage the said bar, and means to raise said rod and throw the safety-lever into engagement with the firing-trigger.

THOMAS C. SMITH.
WASHINGTON A. MARTIN.

Witnesses:
CHAS. C. TILLMAN,
M. A. NYMAN.